United States Patent [19]

Haldeman

[11] 3,895,915

[45] July 22, 1975

[54] GAS ANALYZING

[75] Inventor: Charles W. Haldeman, Concord, Mass.

[73] Assignee: Megatech Corporation, Billerica, Mass.

[22] Filed: Aug. 16, 1973

[21] Appl. No.: 389,015

[52] U.S. Cl. ............... 23/254 R; 23/255 R; 23/256; 73/23

[51] Int. Cl. ............... G01n 31/06; G01n 33/22

[58] Field of Search ............... 23/232 R, 254 R, 256; 73/23, 196

[56] References Cited
UNITED STATES PATENTS

| | | | |
|---|---|---|---|
| 522,746 | 7/1894 | Vehling et al. | 23/232 R |
| 1,435,846 | 11/1922 | Hogg | 23/256 |
| 2,139,902 | 12/1938 | Malmgren | 23/232 R |
| 2,143,041 | 1/1939 | Vayda et al. | 23/232 R |
| 2,263,335 | 11/1941 | Heinz | 73/23 X |
| 2,866,691 | 12/1958 | Feichtinger | 23/254 R |
| 3,519,392 | 7/1970 | Caupeil | 23/254 R |
| 3,593,023 | 7/1971 | Dodson et al. | 23/232 R X |

*Primary Examiner*—Morris O. Wolk
*Assistant Examiner*—Timothy W. Hagen
*Attorney, Agent, or Firm*—Charles Hieken, Esq.; Jerry Cohen, Esq.

[57] ABSTRACT

Exhaust gas from an internal combustion engine is analyzed to define volumetric percentages of selected component gases therein by an apparatus affording direct reading of such percentages and cooperating at high speed. The apparatus comprises float and tube flowmeters interspersed in a flow series with selective sorbents for the gas components to be measured. The tubes of the flowmeters are arranged in parallel alignment with each other and have scales therebetween to display said percentages directly.

8 Claims, 3 Drawing Figures

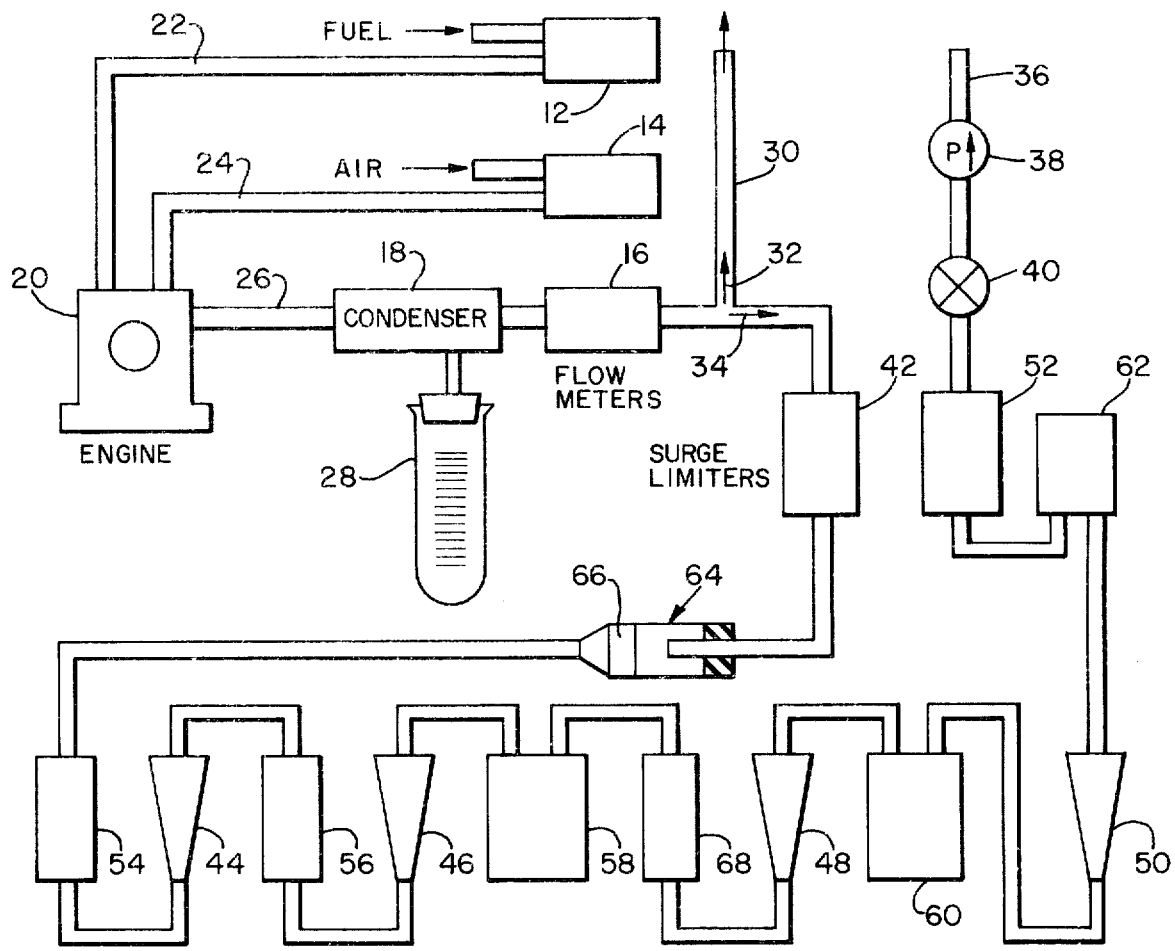
FIG. 1
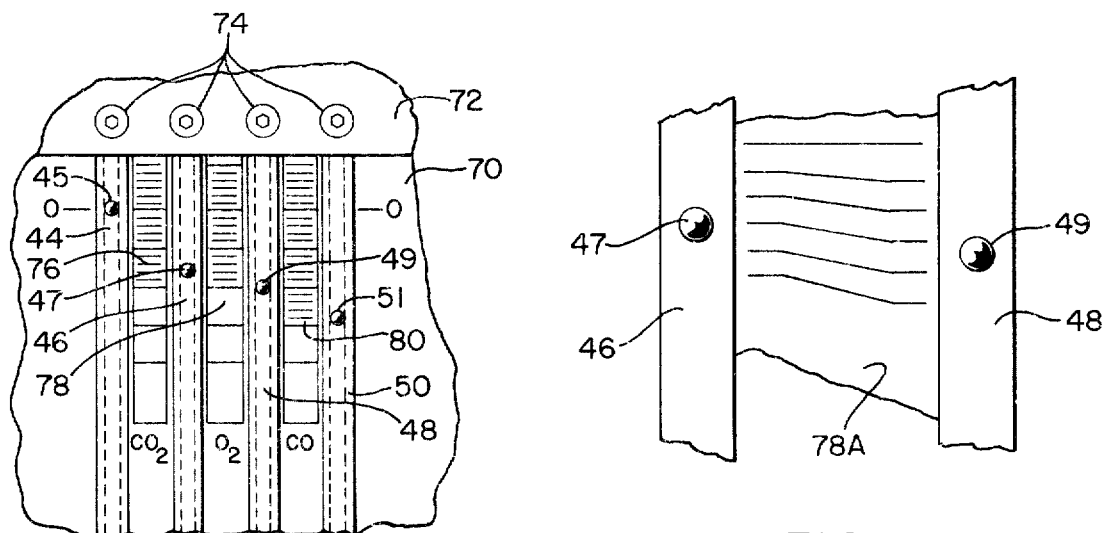
FIG. 2
FIG. 3

3,895,915

GAS ANALYZING

BACKGROUND OF THE INVENTION

The present invention relates to gas analyzing and more particularly to apparatus for high speed analysis of exhaust gas giving direct readings of volumetric percentages of carbon dioxide, oxygen and carbon monoxide component gasses of the exhaust gas mixture.

The evaluation and demonstration of operating principles of many combustion devices, including external and internal combustion engines, furnaces and other fuel and oxidant burning combustion devices, is aided by continuing or intermittent measurement of fuel and oxidant flow, exhaust gas total flow, and volumetric percentages of component gasses in the exhaust gas mixture. Known methods and apparatus for analysis of component gases include optical absorption devices, electronic mass spectrographic instruments and selective chemical absorption instruments. Examples of the latter which have been applied to combustion device exhaust gas analysis include instruments which have a sampling device for sealing a limited sample of the exhaust gas in the apparatus and measuring the volume of the sample before and after reaction with specific reagents which selectively absorb the component gas constituents of the exhaust gas mixture. It would include among others, instruments for measuring volumetric percentage of carbon dioxide, oxygen and carbon monoxide in internal combustion engine exhaust or furnace flue gas manufactured by the Burrell Corporation of Pittsburgh, Pennsylvania and sold under the trademark Indusfro. In such instruments, the sample is sequentially fed into a first absorption pipette, then into a metering pipette, then to a second absorption pipette, then returned to the metering pipette and so forth. Sampling is interrupted during absorption and metering processing rather than being continuous, and the raw data indicated by the instruments require calculation to convert to volumetric percentages of component gases.

It is an important object of the present invention to provide analysis of volumetric percentages of component gases of a gas mixture through apparatus and techniques affording the capability of continuous sampling.

It is a further object of the invention to directly indicate component gas volumetric percentages consistent with the preceding object.

It is a further object of the invention to provide a generally faster operating gas analysis apparatus consistent with one or both of the preceding objects.

It is a further object of the invention to provide compact apparatus consistent with one or more of the preceding objects.

It is a further object of the invention to provide low-cost apparatus consistent with one or more of the preceding objects.

It is a further object of the invention to provide more complete combustion device monitoring for evaluation and demonstration purposes consistent with one or more of the preceding objects.

It is a further object of the invention to measure water content of exhaust gasses consistent with one or more of the preceding objects.

SUMMARY OF THE INVENTION

According to the invention, a gas analyzing apparatus comprises a gas flow series array of flowmeters between a gas flow inlet and a gas flow outlet interspersed with selective sorbent devices for component gasses to be analyzed in a sampled gas mixture. The apparatus further comprises a gas sampling system connected to the gas flow inlet and connectable to a source of gas mixture, such as a combustion engine exhaust pipe. Preferably the gas sampling portion of the apparatus comprises a condenser to remove water vapor from the sampled gas and collect it in a graduated tube. A portion of the gas processed in the gas sampling portion of the apparatus is dumped, and the balance is admitted to the gas flow inlet of the flow series array of flow meters. Controllable gas pumping means drive gas through the array and are selectively adjustable to select the flow rate of gas passage through the array and the proportions of sampled gas dumped and of sampled gas admitted to the gas flow inlet.

The apparatus comprises means for displaying directly differential flow rate between at least two of the flow meters in series indicative of gas absorbed in the course of passage of a sample gas mixture between those flow meters. Preferably the flow meters are of float (e.g. ball float) and tube type with their respective tubes aligned in parallel and straddling a common scale. The difference between the levels of floats within their respective tubes is shown on the scale as a directly read percentage volume of the gas absorbed between the two flow meters. A first one of the flow meters in the series precedes all dry gas selective sorbent devices in the series and is calibratable to zero reference and provides a continuing check of zero reference for all subsequent flow meters in the series. Each of the flow meter tubes is movable with respect to the scale to correct zero reference from time to time.

The apparatus may further comprise flowmeters for measuring fuel and air flow to the combustion device, as well as total exhaust flow and may further be incorporated together with an engine in a common structure for demonstration of principles of engine performance.

Other objects, features and advantages of the invention will be apparent from the following detailed description when read in connection with the accompanying drawing in which:

BRIEF DESCRIPTION OF THE DRAWING

FIG. 1 is a schemataic diagram of apparatus according to a preferred embodiment of the invention;

FIG. 2 is a face view of a section of a front plate of the FIG. 1 apparatus showing the means for reading volumetric percentages of component gases in the gas mixture; and FIG. 3 is a similar view of a smaller portion of the front panel with a modified scale in accordance with a second preferred embodiment of the invention.

DETAILED DESCRIPTION OF PREFERRED EMBODIMENTS

Referring now to the drawing and more particularly FIG. 1 thereof, there is shown apparatus in accordance with a first preferred embodiment of the invention comprising flowmeters 12, 14 and 16, the latter in series with a condenser 18, for measuring fuel flow, air flow and exhaust gas flow entering or exhausting from an internal combustion engine 20 through lines 22, 24 and 26, respectively. Surge chambers (not shown) may be inserted in lines 24 and 26 as is commonly required to prevent the unsteady flow into and out of the engine from affecting meter calibration. Water vapor in the exhaust line 26 is collected in condenser 18 and is dripped into a collection tube 28 which has graduations thereon. The total gas flow through the apparatus is adjusted so that the collected water in tube 28 over the course of 60 seconds gives a water level which is measurable on the graduations. The flow meters, 14 and 16 are of U-tube manometer type with ends of a U-tube straddling an orifice restriction in the respective lines, 24 and 26 and with the legs of the U-tube bracketing a common scale. The air and exhaust flow are then derived from the difference between liquid heights in the legs of each U-tube. The full meter 12, is preferably of the ball and tube type.

A portion of the exhaust gas is dumped through vent pipe 30, the division of exhaust gas between dumping and continuance in the line 26 being indicated by the arrows 32 and 34, respectively. The portion of exhaust gas continuing as indicated by arrow 34 ultimately emerges at vent 36 and is propelled by pump 38. Flow rate of this portion and the proportioning of gas dumped, as indicated by arrow 32, or sample gas processed, as indicated by arrow 34, is determined by settings of a valve 40. The exhaust gas sampled is first passed through a surge limiter 42 comprising a flow series of chambers separated by orifices. The exhaust gas then passes through a series of flow meters 44, 46, 48, 50 of ball and tube type, then through an exit surge limiter 52 and then to the valve 40.

A dessicant chamber 54 precedes the flowmeter 44 in the flow series and comprises an open chamber filled with pellets of a drying agent, such as anhydrous calcium sulphate or other dessicant. A similar chamber 56 contains a carbon dioxide selective sorbent, such as pellets of potassium hydroxide. An absorption bubbler 58 containing pyrogallic acid solution or other oxygen absorber precedes flow meter 48. Another bubbler 60 filled with a carbon monoxide absorbent, such as Burrell Corporation's COSORBENT brand sorbent for carbon monoxide, precedes flow meter 50 in the flow series. Preferably a reservoir is provided at 62 to further limit surge pulsations caused by pump 38 and isolate these from the gas flow series array of flowmeters interspersed with sorbents. The apparatus preferably further comprises a sampling line 64 with a red tape indicator 66 to mark its location for easy removal should it be desired to admit external samples to metering tubes without using condenser 18.

A dryer may be provided at 68 between the bubbler 58 and flow meter 48 to prevent water vapor pickup from the sorbent from causing errors.

Referring now to FIG. 2 there is shown a portion of a front panel for the apparatus for reading the volumetric percentages of component gases of the exhaust gas mixture. The panel is indicated at 70 and comprises flow meter tubes 44, 46, 48 and 50 straddling scales 76, 78 and 80. The tubes and scales are all aligned parallel to each other. A hood panel 72 overhangs the panel 70 and comprises clamping screws indicated at 74 for clamping the tubes in selected positions. The difference in height between the ball 45 in tube 44 and ball 47 in tube 46 is readable directly on scale 76 as volumetric percentage of carbon dioxide. The difference in height between ball 47 and ball 49 in tube 48 is readable on scale 78 as the volumetric percentage of oxygen (2%) in the exhauast gas mixture. The difference in height between ball 49 and ball 51 in tube 50 is readable on scale 80 directly as volumetric percentage of carbon monoxide in the exhaust gas mixture. To calibrate the instrument a dry inert gas, such as nitrogen, can be passed therethrough, and the tubes adjusted so that all their respective balls are on a marked zero reference and then clamped at such position. Ball 45 provides a continuous check of such zero reference.

Referring now to FIG. 3 there is shown a variation of the scales illustrated for scale 78 only although it will be understood that the variation is applicable to all the scales. The indicia on the revised scale 78A are spread further apart adjacent tube 48 than adjacent 46 to allow for the drop in pressure between tubes 46 and 48 (on the order of 1%). In many instances this difference will be negligible and parallel scale lines and average spacing may be satisfactorily used as in FIG. 2.

There has now been disclosed apparatus which allows continuous analysis of exhaust gas and other gas mixtures, direct reading of component gas volumetric percentages and, preferably, fuel and oxidant and total exhaust flow rate and water vapor content of the exhaust from an internal combustion engine or other source.

The apparatus may be utilized in the complete combination shown in FIGS. 1–3 or in distinct subcombinations thereof, such as any two flow meters of the flow series array and their intervening sorbent and scale, before going together with the sampling system, either of the foregoing together with the flow meters 12, 14 and 16 and condenser 18, any of the foregoing together with engine 20. Preferably, all the components shown in FIGS. 1–3, excepting the engine are contained in a single housing.

It is evident that those skilled in the art, once given the benefit of the foregoing disclosure, may now make numerous other uses and modifications of, and departures from the specific embodiments described herein without departing from the inventive concepts. Consequently, the invention is to be construed as embracing each and every novel feature and novel combination of features present in, or possessed by, the apparatus and techniques herein disclosed and limited solely by the scope and spirit of the appended claims.

What is claimed is:
1. Gas analyzing apparatus comprising,
   means defining a gas flow series array of flowmeters between a gas flow inlet and a gas flow outlet interspersed with means for selectively sorbing component gases of a gas mixture to be analyzed,
   means defining a gas sampling system connected to said gas flow inlet for taking gas samples and comprising means for condensing water vapor and for dumping a portion of the gas sampled before admittance of the balance to said gas flow inlet,
   means for driving gas through said array and selecting flow rate therefor and proportions of sample gas dumped and sampled gas admitted to said gas flow inlet,
   and means for displaying directly differential flow rate between at least two of said flowmeters indicative of gas sorbed in the course of passage of a sample gas mixture between said flowmeters, and wherein
   said two flowmeters are of ball and tube type and are arranged with their tubes in parallel and said display means comprise a common scale between said tubes, and further comprising an additional flowmeter means located within said apparatus for defining a zero reference for said scale.

2. Gas analyzing apparatus in accordance with claim 1, wherein
the sorbing means comprise sorbents for carbon dioxide, oxygen and carbon monoxide,
each of said sorbents being preceded and followed in the flow series by a flowmeter.

3. Gas analyzing apparatus in accordance with claim 2 and further comprising
a combustion device with fuel and oxidant feed means in combination therewith,
the exhaust of the combustion device being coupled to said gas sampling system, and
means for measuring flow of fuel and oxidant to said combustion device.

4. Gas analyzing apparatus in accordance with claim 1 and further comprising
means for isolating said flow series array from gas flow surges at the inlet and/or outlet thereof.

5. Gas analyzing apparatus in accordance with claim 1 wherein
said scale is calibrated to expand from one flowmeter to the other in proportion to expected pressure differential therebetween.

6. Gas analyzing apparatus in accordance with claim 1 wherein
said means defining a zero reference comprise a first flowmeter in said series upstream of all dry gas sorbing means in said series.

7. Gas analyzing apparatus in accordance with claim 6 wherein
said parallel tubes are adjustable relative to the scale therebetween to calibrate the apparatus for absolute reading.

8. Gas analyzing apparatus in accordance with claim 7 wherein
more than two of said tubes are provided in interspersed array with more than one of said scales.

* * * * *